United States Patent
Tamori et al.

(10) Patent No.: US 7,981,512 B2
(45) Date of Patent: Jul. 19, 2011

(54) ORGANIC POLYMER-MAGNETIC PARTICLES AND PROCESS FOR PRODUCING SAME

(75) Inventors: Kouji Tamori, Tsuchiura (JP); Eiji Takamoto, Tsuchiura (JP); Takahiro Kawai, Tsuchiura (JP)

(73) Assignee: JSR Corporation, Tokyo (JP)

( * ) Notice: Subject to any disclaimer, the term of this patent is extended or adjusted under 35 U.S.C. 154(b) by 760 days.

(21) Appl. No.: 11/773,801

(22) Filed: Jul. 5, 2007

(65) Prior Publication Data

US 2008/0078974 A1    Apr. 3, 2008

(30) Foreign Application Priority Data

Sep. 28, 2006  (JP) .................................. 2006-264646

(51) Int. Cl.
*B32B 5/16*    (2006.01)
(52) U.S. Cl. ......... 428/403; 523/200; 523/204; 428/407
(58) Field of Classification Search .................. 523/200, 523/204; 428/403, 407
See application file for complete search history.

(56) References Cited

U.S. PATENT DOCUMENTS

| | | | |
|---|---|---|---|
| 4,336,173 A | 6/1982 | Ugelstad | |
| 4,459,378 A | 7/1984 | Ugelstad | |
| 6,716,949 B2 * | 4/2004 | Ganapathiappan | 526/317.1 |
| 7,157,024 B2 * | 1/2007 | Isaji et al. | 252/519.1 |
| 7,220,528 B2 * | 5/2007 | Ganapathiappan | 430/137.16 |
| 7,393,884 B2 * | 7/2008 | Furutani et al. | 523/160 |
| 7,713,627 B2 * | 5/2010 | Tamori et al. | 428/407 |
| 7,732,051 B2 * | 6/2010 | Tamori et al. | 428/407 |

FOREIGN PATENT DOCUMENTS

| | | |
|---|---|---|
| JP | 57-24369 | 5/1982 |
| JP | 61-215602 | 9/1986 |
| JP | 61-215603 | 9/1986 |
| JP | 61-215604 | 9/1986 |
| JP | 9-304386 | 11/1997 |
| JP | 10-270233 | 10/1998 |
| JP | 2004-205481 | 7/2004 |
| WO | WO97/35964 | 10/1997 |

OTHER PUBLICATIONS

Machine translation of JP 10-270,233, 1998.*
U.S. Appl. No. 12/602,138, filed Nov. 27, 2009, Tamori, et al.
U.S. Appl. No. 11/914,986, filed Nov. 20, 2007, Takahashi, et al.
U.S. Appl. No. 11/961,562, filed Dec. 20, 2007, Tamori, et al.
U.S. Appl. No. 12/529,824, filed Sep. 3, 2009, Katayose, et al.
U.S. Appl. No. 11/954,289, filed Dec. 12, 2007, Tamori, et al.

* cited by examiner

*Primary Examiner* — H. (Holly) T Le
(74) *Attorney, Agent, or Firm* — Oblon, Spivak, McClelland, Maier & Neustadt, L.L.P.

(57) ABSTRACT

Organic polymer particles having a structure shown by the following formula (1) are disclosed.

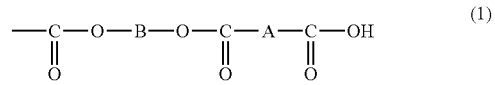

wherein A represents an alkylidene group, an alkylene group, a cyclohexylene group, or a phenylene group, and B represents a linear or branched alkylene group or an alkylidene group having 1 to 6 carbon atoms.

18 Claims, No Drawings

ORGANIC POLYMER-MAGNETIC PARTICLES AND PROCESS FOR PRODUCING SAME

Japanese Patent Application No. 2006-264646 filed on Sep. 28, 2006 is hereby incorporated by reference in its entirety.

BACKGROUND OF THE INVENTION

The present invention relates to organic polymer particles that can chemically bond to biological-related substances, including proteins such as an antibody or an antigen, by utilizing a carboxyl group, and can exhibit high detection sensitivity, and to a process for producing the same.

Organic polymer particles and magnetic particles are used as a reaction solid phase of a diagnostic agent using an antigen-antibody reaction in order to detect substances to be examined such as infections, cancer markers, and hormones, for example. In such a diagnostic agent, a probe (primary probe) for inspecting an antibody or an antigen is immobilized on the particles. A substance to be inspected in a sample reacts with a second inspection probe after having been trapped on the particles via the primary probe. The second inspection probe (secondary probe) is labeled with a fluorescent substance or an enzyme, whereby the target substance is detected by fluorescence or by an enzyme reaction.

In recent years, due to a demand for an increase in the inspection sensitivity for the early detection of diseases, an increase in sensitivity of a diagnostic agent has been an important subject. In order to increase sensitivity of diagnostic agents using magnetic particles, a method of using enzyme coloring as a detecting means is being replaced by a method of using fluorescence or chemiluminescence, both of which ensure higher sensitivity.

Development of these detection techniques are said to have reached a level in which a one molecule-substance for inspection can be theoretically detected. In practice, however, sensitivity is still insufficient. The incapability of maintaining the activity of the primary probe after bonding due to change in the conformation of the protein, which is the primary probe bonded to the particles, can be given as a reason for this.

Generally, as methods for maintaining the activity of such a primary probe, a method of causing a polyhydric alcohol to be present when the primary probe is bonded, and a method of bonding the primary probe via a hybrid protein bonded to the particles are disclosed (JP-A-9-304386 and WO 97/35964). However, the activity of the primary probe is insufficient when the primary probe is bonded by the method of causing a polyhydric alcohol to be present together. The method of using a hybrid protein involves a complicated and high-cost production process.

SUMMARY

An object of the invention is to provide organic polymer particles that can chemically bond to biological-related substances, including proteins such as an antibody or an antigen, by utilizing a carboxyl group, and can exhibit high detection sensitivity, and to a process for producing the same.

In order to achieve the above object, the inventors have conducted extensive studies and found that organic polymer particles made from a polymer containing a carboxylic acid monomer scarcely soluble in water exhibit outstandingly high sensitivity in the fields of biological chemistry and medical supplies. This finding has led to the completion of the invention.

Organic polymer particles according to one aspect of the invention have a structure shown by the following formula (1).

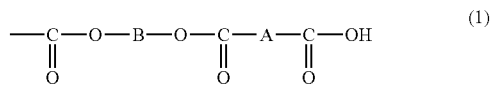

wherein A represents an alkylidene group, an alkylene group, a cyclohexylene group, or a phenylene group, and B represents a linear or branched alkylene group or an alkylidene group having 1 to 6 carbon atoms.

The structure represented by the formula (1) may be derived from at least one compound selected from 2-(meth)acryloyloxyethyl succinate, 2-(meth)acryloyloxyethyl phthalate, 2-(meth)acryloyloxyethyl hexahydrophthalate, 2-(meth)acryloyloxypropyl succinate, 2-(meth)acryloyloxypropyl phthalate, and 2-(meth)acryloyloxypropyl hexahydrophthalate.

Organic polymer particles according to one aspect of the invention have a structure shown by the following formula (2).

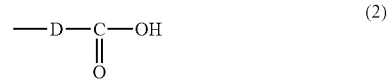

wherein D represents a linear or branched alkylene group having 2 to 13 carbon atoms.

The structure represented by the formula (2) may be derived from at least one compound selected from 2-(meth)acryloyloxyethyl succinate, 2-(meth)acryloyloxypropyl succinate, myristoleic acid, palmitoleic acid, oleic acid, elaidic acid, vaccenic acid, gadoleic acid, erucic acid, nervonic acid, linolic acid, alpha-linolenic acid, eleostearic acid, stearidonic acid, arachidonic acid, eicosapentaenoic acid, clupanodonic acid, and docosahexaenoic acid.

Organic polymer particles according to one aspect of the invention have a structure shown by the following formula (3).

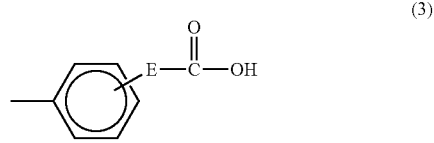

wherein E represents an alkylene group or an alkylidene group having 1 to 12 carbon atoms which may be branched, or a single bond.

The structure represented by the formula (3) may be derived from at least one compound selected from 2-(meth)acryloyloxyethyl phthalate, 2-(meth)acryloyloxypropyl phthalate, p-vinylbenzoic acid, and vinylphenylacetic acid.

The above organic polymer particles may contain a magnetic material.

In the above organic polymer particles, the particle surface may comprise a copolymer made from a compound (A) having a structure of any one of the above formulas (1) to (3) and a polymerizable unsaturated group, and another copolymerizable monomer (B).

In this case, the organic polymer particles may comprise mother particles containing nuclear particles and a magnetic material layer of superparamagnetic fine particles formed on the surface of the nuclear particles, and a copolymer layer made from the above copolymer which is formed to cover the mother particles.

The above organic polymer particles may be used for protein bonding.

A process for producing organic polymer particles according to one aspect of the invention comprises polymerizing a monomer part comprising a compound having a structure of any one of the above formulas (1) to (3) and an ethylenically unsaturated group.

The above organic polymer particles can chemically bond to biological-related substances, including proteins such as an antibody or an antigen, by utilizing the carboxyl group, and can exhibit high detection sensitivity.

Since the above organic polymer particles have a high primary probe activity when bonded to a primary probe, the organic polymer particles can exhibit high sensitivity when applied to a diagnostic agent and the like. Thus, the organic polymer particles are useful as a diagnostic agent and the like.

DETAILED DESCRIPTION OF THE EMBODIMENTS

Organic polymer particles of one embodiment of the invention and a process for producing the organic polymer particles will be described below.

1. ORGANIC POLYMER PARTICLES AND PROCESS FOR PRODUCING THE SAME

1.1. Constitution of Organic Polymer Particles

The organic polymer particles according to one embodiment of the invention have a carboxyl group originating from a compound (A) possessing a specific structure having a carboxyl group and a polymerizable unsaturated group (hereinafter referred to from time to time as "carboxylic acid monomer (A)"). The carboxyl group originating from the compound (A) refers to the carboxyl group contained in the carboxylic acid monomer (A).

The organic polymer particles according to one embodiment of the invention may have a carboxyl group originating from the carboxylic acid compound (A) having solubility of 20% by mass or less in water at 25° C. The carboxylic acid compound (A) may contain a radically polymerizable unsaturated double bond and a carboxyl group in one molecule.

At least the surface of the organic polymer particles according to this embodiment comprises a polymer part, and the polymer part may have a carboxyl group originating from the carboxylic acid compound (A). The polymer part may be either a polymer formed by polymerization of the carboxylic acid monomer (A) or a copolymer formed by copolymerization of a monomer part containing the carboxylic acid monomer (A) and another copolymerizable monomer (B).

Either the entirety of the organic polymer particles according to this embodiment may consist of a polymer part or the organic polymer particles may have a core-shell structure, with the shell being formed of a polymer part.

For example, when the polymer part is prepared by polymerizing a commonly-used carboxylic acid monomer with high solubility in water, such as acrylic acid or methacrylic acid, a water-soluble polymer is easily produced. If such a water-soluble polymer bonds to the surface of particles, it is thought that active sites of a biological-related substance (for example, a protein) bonded to the particle surface is sterically hindered, or the conformation of the bonded biological-related substance (for example, a protein) is destroyed by polycarboxylic acid charges, thereby lowering the activity. As a result, it is thought that the sensitivity is reduced.

On the other hand, according to the organic polymer particles according to this embodiment, since the polymer part is formed by using a specific carboxylic acid monomer, it is difficult to produce a water-soluble polymer. It is presumed that this is the reason why organic polymer particles exhibit high sensitivity.

In the organic polymer particles according to this embodiment, the carboxyl group originating from the carboxylic acid monomer (A) is a factor for exhibiting high sensitivity and accelerating bonding with a probe for inspection (a primary probe, for example, a protein) by known activation by means of esterification or amidation using a water-soluble carbodiimide and the like. Proteins usable as the primary probe and the method for bonding will be described later.

The carboxylic acid monomer (A) has solubility in water at 25° C. of 20% by mass or less, preferably 10% by mass or less, and most preferably 5% by mass or less. If the solubility in water at 25° C. of the carboxylic acid monomer (A) is more than 20% by mass, high sensitivity is not exhibited.

In the invention, the solubility in water at 25° C. of the monomer is determined by slowly adding the monomer in question to distilled water at 25° C. while stirring until the monomer separates from the water. The amount (% by mass) of the monomer in the solution immediately before separation is defined as the solubility.

As examples of the carboxylic acid monomer (A), (meth)acrylic acid derivatives such as 2-(meth)acryloyloxyethyl succinate, 2-(meth)acryloyloxyethyl phthalate, 2-(meth)acryloyloxyethyl hexahydrophthalate, 2-(meth)acryloyloxypropyl succinate, 2-(meth)acryloyloxypropyl phthalate, and 2-(meth)acryloyloxypropyl hexahydrophthalate; aromatic derivatives such as p-vinylbenzoic acid and vinylphenylacetic acid; and unsaturated fatty acids such as myristoleic acid, palmitoleic acid, oleic acid, elaidic acid, vaccenic acid, gadoleic acid, erucic acid, nervonic acid, linolic acid, alpha-linolenic acid, eleostearic acid, stearidonic acid, arachidonic acid, eicosapentaenoic acid, clupanodonic acid, and docosahexaenoic acid can be given. Among the above compounds, in view of high sensitivity of the resulting organic polymer particles and ease of polymerization, the carboxylic acid monomer (A) is preferably a (meth)acrylic acid derivative, more preferably a monoester compound of a hydroxyalkyl (meth)acrylate and a dicarboxylic acid, and still more preferably 2-(meth)acryloyloxyethyl succinate, 2-(meth)acryloyloxyethyl phthalate, or 2-(meth)acryloyloxyethyl hexahydrophthalate, and most preferably 2-methacryloyloxyethylphthalate.

The organic polymer particles according to this embodiment may have the structure shown by the following formulas (1) to (3).

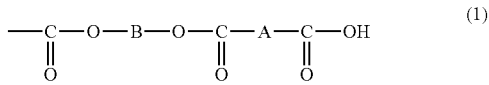

wherein A represents an alkylidene group, an alkylene group, a cyclohexylene group, or a phenylene group, and B represents a linear or branched alkylene group or an alkylidene group having 1 to 6 carbon atoms.

(2)

wherein D represents a linear or branched alkylene group having 2 to 13 carbon atoms.

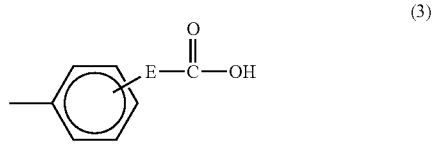

(3)

wherein E represents an alkylene group or an alkylidene group having 1 to 12 carbon atoms which may be branched, or a single bond.

In formula (1), as examples of the alkylidene group represented by A or B, an ethylidene group, an isopropylidene group, and an isobutylidene group can be given; as examples of the alkylene group represented by A or B, a methylene group, a dimethylene group, a trimethylene group, a tetramethylene group, a pentamethylene group, and a hexamethylene group can be given; as examples of the cyclohexylene group represented by A, a 1,2-cyclohexylene group, a 1,3-cyclohexylene group, and a 1,4-cyclohexylene group can be given; and as examples of the phenylene group represented by A, a 1,2-phenylene group, a 1,3-phenylene group, and a 1,4-phenylene group can be given. Among these, the structure of formula (1) in which the alkylene group represented by B is a dimethylene group or a trimethylene group is preferable.

In formula (2), as examples of the alkylene represented by D, a dimethylene group, a trimethylene group, a tetramethylene group, a pentamethylene group, a hexamethylene group, a heptamethylene group, a nonamethylene group, an undecamethylene group, and a tridecamethylene group can be given.

In formula (3), as examples of the alkylidene group represented by E, an ethylidene group, an isopropylidene group, and an iso-butylidene group can be given; and as examples of the alkylene group, a methylene group, a dimethylene group, a trimethylene group, a tetramethylene group, a pentamethylene group, and a hexamethylene group can be given.

The structure shown by the above formulas (1) to (3) may be included in the above carboxylic acid monomer (A).

The structure represented by formula (1) is preferably derived from one of the compounds selected from the group consisting of 2-(meth)acryloyloxyethyl succinate, 2-(meth)acryloyloxyethyl phthalate, 2-(meth)acryloyloxyethyl hexahydrophthalate, 2-(meth)acryloyloxypropyl succinate, 2-(meth)acryloyloxypropyl phthalate, 2-(meth)acryloyloxypropyl hexahydrophthalate, 2-(meth)acryloyloxyethyl succinate, 2-(meth)acryloyloxyethyl phthalate, 2-(meth)acryloyloxyethyl hexahydrophthalate, 2-(meth)acryloyloxypropyl succinate, 2-(meth)acryloyloxypropyl phthalate, and 2-(meth)acryloyloxypropyl hexahydrophthalate.

In addition, for example, the structure represented by formula (2) is preferably derived from one of the compounds selected from the group consisting of 2-(meth)acryloyloxyethyl succinate, 2-(meth)acryloyloxypropyl succinate, myristoleic acid, palmitoleic acid, oleic acid, elaidic acid, vaccenic acid, gadoleic acid, erucic acid, nervonic acid, linolic acid, alpha-linolenic acid, eleostearic acid, stearidonic acid, arachidonic acid, eicosapentaenoic acid, clupanodonic acid, and docosahexaenoic acid.

Furthermore, for example, the structure represented by formula (3) is preferably derived from one of the compounds selected from the group consisting of 2-(meth)acryloyloxyethyl phthalate, 2-(meth)acryloyloxypropyl phthalate, p-vinylbenzoic acid, and vinylphenylacetic acid.

Since the structures shown by the above-mentioned formulas (1) to (3) neither three-dimensionally hinder the active sites of bonded biological-related substances (for example, a protein) nor destroy the conformation of bonded biological-related substances (for example, a protein) on the surface of polymer particles, these structures enable the polymer particles to exhibit high sensitivity.

The organic polymer particles according to this embodiment may have at least one of the structures shown by the above formulas (1) to (3).

The organic polymer particles according to this embodiment may have a structure shown by the above formulas (1) to (3) at least on the surface, and it is preferable that the above polymer part has the structure.

In the polymer part of the organic polymer particles according to this embodiment, the amount of the carboxyl group per the amount of solid components of the particles is preferably from 1 to 300 micromol/g, more preferably from 2 to 200 micromol/g, and most preferably from 5 to 100 micromol/g. If the amount of the carboxyl group is less than 1 micromol/g, bonding of a primary probe may be difficult; on the other hand, if more than 300 micromol/g, non-specific adsorption may increase. The hydrogen ion of the carboxyl group may be replaced by a cation such as a sodium ion, a potassium ion, or an ammonium ion.

The number average particle size (hereinafter referred to simply as "particle size") of the organic polymer particles according to this embodiment is preferably from 0.01 to 15 micrometers, more preferably from 0.03 to 10 micrometers, and most preferably from 0.05 to 10 micrometers. The particle size can be determined by a laser diffraction-scattering method. If the particle size is less than 0.01 micrometers, it takes a long time for separation using centrifugation and the like, resulting in insufficient separation of the particles from a washing solvent such as water. This makes it difficult to sufficiently remove molecules other than target molecules (e.g. biological-related substances such as proteins and nucleic acids), giving rise to possible inadequate purification. On the other hand, if the particle size is more than 15 micrometers, the sensitivity may be impaired as a result of a decrease in the amount of captured physiologically active substances due to a small specific surface area.

The organic polymer particles according to this embodiment are usually used by dispersing in an appropriate dispersion medium. A dispersion medium not dissolving the organic polymer particles or not swelling the organic polymer particles is preferably used as the dispersion medium. An aqueous medium can be given as a preferable dispersion medium, for example. The aqueous medium here refers to water or a mixture of water and an organic solvent miscible with water (e.g. alcohols and alkylene glycol derivatives).

1.2. Production of Organic Polymer Particles 1.2.1. Composition of Monomer Part

The organic polymer particles according to this embodiment are produced by forming a polymer part obtained by polymerizing a monomer part. Each of the monomers for forming the monomer part will now be described.

1.2.1-1. Carboxylic Acid Monomer (A)

The types of monomer components of the carboxylic acid monomer (A) are as described above.

The carboxylic acid monomer (A) is used in the monomer part preferably in an amount of 2% by mass or more, and more preferably 5% by mass or more. If the amount of the carboxylic acid monomer (A) in the monomer part is less than 2% by mass, bonding of the primary probe may become difficult.

1.2.1-2. Other Copolymerizable Monomer (B)

Any non-crosslinkable (monofunctional) monomers and crosslinkable (polyfunctional) monomers, or a mixture of these monomers can be used as the other copolymerizable monomer (B).

As examples of the non-crosslinkable (monofunctional) monomers among copolymerizable monomers (B), (meth)acrylates having a hydrophilic functional group such as 2-hydroxyethyl acrylate, 2-hydroxyethyl methacrylate, methoxyethyl acrylate, methoxyethyl methacrylate, polyethylene glycol monoacrylate, polyethylene glycol monomethacrylate, glycidyl acrylate, glycidyl methacrylate, 2,3-dihydroxypropyl acrylate, and 2,3-dihydroxypropyl methacrylate; hydrophilic monomers such as acrylamide, methacrylamide, N-methylolacrylamide, N-methylolmethacrylamide, and diacetoneacrylamide; aromatic vinyl monomers such as styrene, alpha-methylstyrene, and halogenated styrene; vinyl esters such as vinyl acetate and vinyl propionate; unsaturated nitriles such as acrylonitrile; and ethylenically unsaturated alkyl carboxylates such as methyl acrylate, methyl methacrylate, ethyl acrylate, ethyl methacrylate, butyl acrylate, butyl methacrylate, 2-ethylhexyl acrylate, 2-ethylhexyl methacrylate, lauryl acrylate, lauryl methacrylate, stearyl acrylate, stearyl methacrylate, cyclohexyl acrylate, cyclohexyl methacrylate, isobornyl acrylate, and isobornyl methacrylate can be given.

As examples of the crosslinkable (polyfunctional) monomers among copolymerizable monomers (B), polyfunctional (meth)acrylates such as ethylene glycol diacrylate, ethylene glycol dimethacrylate, trimethylolpropane triacrylate, trimethylolpropane trimethacrylate, pentaerythritol triacrylate, pentaerythritol trimethacrylate, dipentaerythritol hexacrylate, dipentaerythritol hexamethacrylate; conjugated diolefins such as butadiene and isoprene; divinylbenzene, diallyl phthalate, allyl acrylate, allyl methacrylate, and the like can be given. As further examples, hydrophilic monomers such as polyethylene glycol diacrylate, polyethylene glycol dimethacrylate, and poly(meth)acrylates of a polyvinyl alcohol can be given.

Carboxylic acid monomers having a solubility in water exceeding 20% by mass, such as acrylic acid, methacrylic acid, maleic acid, and itaconic acid may be used as the other copolymerizable monomer (B) in a range not hindering the effect of the invention.

The amount of the other copolymerizable monomer (B) used is a balance other than the above carboxylic acid monomer (A).

1.2.2. Polymerization Method

The organic polymer particles according to this embodiment may be produced by a known method such as emulsion polymerization, soap-free polymerization, and suspension polymerization. Specifically, the organic polymer particles according to this embodiment may be obtained by, for example, suspension polymerization of the above vinyl monomer or polymer bulk shattering. For example, the organic polymer particles according to this embodiment can be obtained by the two-step swelling polymerization method using seed particles (mother particles) described in JP-UM-B-57-24369, the polymerization method described in J. Polym. Sci., Polymer Letter Ed., 21, 937 (1983), and the methods described in JP-A-61-215602, JP-A-61-215603, and JP-A-61-215604. Of these, the two-step swelling polymerization method using seed particles (nuclear particles) is preferable for reducing the coefficient of particle size variation. Polystyrene or a styrene-based copolymer can be used as the seed particles (nuclear particles). The polymer part added by the two-step swelling polymerization method consists of a homopolymer of the above-mentioned carboxylic acid monomer (A) or a copolymer of the carboxylic acid monomer (A) and the monomer (B).

As the emulsifier used when copolymerizing the above monomer part, anionic surfactants such as alkyl sulfate, alkylaryl sulfate, alkyl phosphate, and fatty acid salts; cationic surfactants such as alkyl amine salts and alkyl quaternary amine salts; nonionic surfactants such as polyoxyethylene alkyl ether, polyoxyethylene alkyl aryl ether, and block polyether; amphoteric surfactants such as carboxylic acid types (e.g. amino acids, betaine acids, and the like) and sulphonic acid types; reactive emulsifiers with commercial names such as Latemul S-180A™, and PD-104™ (manufactured by KAO Corp.), Eleminol JS-2™ (manufactured by Sanyo Chemical Industries, Ltd.), Aqualon HS-10™, KH-10™, RN-10™, RN-20™, RN-30™, and RN-50™ (manufactured by Dai-ichi Kogyo Seiyaku Co., Ltd.), ADEKA REASOAP SE-10N™, SR-10™, NE-20™, NE-30™, and NE-40™ (manufactured by ADEKA Corp.), and Antox MS-60™ (manufactured by Nippon Nyukazai Co., Ltd.); and the like can be given. Reactive emulsifiers are particularly preferable due to excellent particle dispersibility. Also, polymers having a hydrophilic group with a dispersion function may be used as the emulsifier. As examples of such polymers, styrene-maleic acid copolymers, styrene-acrylic acid copolymers, polyvinyl alcohols, polyalkylene glycols, sulfonated products of polyisoprene, sulfonated products of hydrogenated styrene-butadiene copolymers, sulfonated products of styrene-maleic acid copolymers, sulfonated products of styrene-acrylic acid copolymers, and the like can be given. These emulsifiers can be used either individually or in combination of two or more. Although there are no specific limitations to the amount of the emulsifier to be used, the amount is usually from 0.1 to 50 parts by weight, preferably from 0.2 to 20 parts by weight, and particularly preferably from 0.5 to 5 parts by weight for 100 parts by weight of the monomers used as the monomer part. An amount less than 0.1 part by weight is not preferable due to insufficient emulsification and decline in stability during radical polymerization. On the other hand, an amount exceeding 50 parts by weight is not desirable due to the problem of foaming.

As the radical polymerization initiator used in the copolymerization of the monomer part, persulfates such as potassium persulfate, sodium persulfate, and ammonium persulfate; water-soluble initiators such as hydrogen peroxide, t-butyl hydroperoxide, t-butylperoxymaleic acid, peroxide succinate, and 2,2'-azobis[2-N-benzylamidino]propane hydrochloride; oil-soluble initiators such as benzoyl peroxide, cumene hydroperoxide, diisopropyl peroxydicarbonate, cumyl peroxyneodecanoate, cumyl peroxyoctoate, and azobisisobutyronitrile; redox initiators using reducing agents such as acidic sodium sulfite, rongalite, and ascorbic acid; and the like can be given.

1.3. Organic Polymer Particles Containing Magnetic Material and Process for Producing the Same The organic polymer particles according to this embodiment may be organic polymer particles containing a magnetic material (hereinafter referred to as "magnetic material-containing organic polymer particles"). Since the magnetic material-containing organic polymer particles can be separated using a magnet without using centrifugation, for example, separating particles from samples to be inspected can be simplified or automated.

The magnetic material-containing organic polymer particles include (I) particles comprising a continuous phase of a non-magnetic material such as an organic polymer with fine magnetic material particles being dispersed therein, (II) particles comprising a core of a secondary aggregate of fine magnetic material particles and a shell of non-magnetic material such as an organic polymer, (III) particles comprising mother particles, which contain nuclear particles of a non-magnetic material such as an organic polymer and a secondary aggregate layer (a magnetic material layer) of fine magnetic material particles provided on the surface of the nuclear particles, as a core, and an outermost organic polymer layer of the mother particles, as a shell, and the like. Of these, the above mentioned (III) particles consisting of a core of the mother particles containing a secondary aggregate layer of fine magnetic material particles and a shell of an organic polymer layer are preferable. Among the organic polymers used for the magnetic material-containing organic polymer particles with various structures, the polymer forming the outermost surface of the particles, excluding a core portion of the core-shell type particles, must have a carboxyl group originating from the carboxylic acid compound (A) having a solubility of 20% by mass or less in water at 25° C.

The most preferable magnetic material-containing organic polymer particles have an organic polymer layer covering mother particles containing nuclear particles and a magnetic material layer of superparamagnetic fine particles formed on the surface of the nuclear particles. Here, the organic polymer layer can be obtained by the above-mentioned production process. That is, the organic polymer layer can be obtained by polymerizing the monomer part containing the carboxylic acid monomer (A). In addition, the organic polymer layer is preferably a copolymer layer made from the carboxylic acid monomer (A) and the other copolymerizable monomer (B).

The thickness of the organic polymer layer is preferably 0.01 micrometers or more. A thickness of 0.01 micrometers or more can prevent leakage of superparamagnetic fine particles.

As the method for producing mother particles with a magnetic material layer of superparamagnetic fine particles on the surface of nuclear particles, a method of dry-blending non-magnetic organic polymer particles and superparamagnetic fine particles and complexing these particles by physically applying a strong external force can be given, for example. As examples of the method for physically applying a strong force, a method of using a mortar, an automatic mortar, or a ball mill, a blade-pressuring type powder compressing method, a method of utilizing a mechanochemical effect such as a mechnofusion method, and a method using an impact in a high-speed air stream such as a jet mill, a hybridizer, or the like can be given. In order to efficiently produce a firmly bound complex, a strong physical adsorption force is desirable. As a method for applying a strong physical adsorption force, stirring using a vessel equipped with a stirrer having stirring blades with a peripheral speed of preferably 15 m/sec or more, more preferably 30 m/sec or more, and still more preferably from 40 to 150 m/sec can be given. If the peripheral speed of the stirring blades is slower than 15 m/sec, a sufficient amount of energy for causing superparamagnetic fine particles to be absorbed onto the surface of the non-magnetic organic polymer particles may not be obtained.

Although there are no specific limitations to the upper limit of the peripheral speed of the stirring blades, the upper limit of the peripheral speed is determined according to the apparatus to be used, energy efficiency, and the like. Fine particles of ferrite and/or magnetite with a particle size of about 5 to 20 nm, for example, can be preferably used as the superparamagnetic fine particles used in the particles according to this embodiment.

A more specific method of polymerization is disclosed in JP-A-2004-205481 and the like.

1.4. Application

The organic polymer particles according to this embodiment can be used as an affinity carrier such as particles for chemical compound-bonding carriers in the biochemical field, particles for chemical-bonding carriers for diagnostics gents, and the like, and particularly can exhibit remarkably high sensitivity as protein-bonding particles for immunoassay bonded with a protein, such as an antigen or an antibody, as the primary probe.

In the organic polymer particles according to this embodiment, the substances to be inspected are biological-related substances and chemical compounds which are contained in immunoassay reagents and inspection samples. In the invention, the term "biological-related substance" refers to all substances relating to biological bodies. As examples of the biological-related substance, substances contained in biological bodies, substances derived from substances contained in biological bodies, and substances which can be used in biological bodies can be given. Examples of the biological-related substances include, but are not limited to, proteins (e.g., enzymes, antibodies, aptamers, and acceptors), peptides (e.g., glutathione), nucleic acids (e.g., DNA and RNA), carbohydrates, lipids, and other cells and substances (e.g., various blood-originating substances and various floating cells containing various blood cells such as platelets, erythrocytes, and leukocytes).

According to the organic polymer particles according to the embodiment in which the polymer part having carboxyl groups is introduced on the surface of the particles, since the carboxyl groups are activated by known activators such as a water-soluble carbodiimide in actual use, a primary probe can be chemically bonded to the surface of the particles by mixing the primary probe with the particles.

After bonding the primary probe onto the surface of the particles, an excess amount of the primary probe is washed out and unreacted activated carboxyl groups are deactivated as required. In addition, after the primary probe is bonded onto the surface of the particles, a known blocking operation may be conducted or a blocking agent such as albumin may be used in the deactivation. A known analytical procedure using the particles may follow.

The prove which can be supported by the organic polymer particles according to this embodiment is a protein, preferably an antigen or an antibody. Any antigens and antibodies reactive with a component generally contained in samples can be used without specific limitations. Examples which can be given include, but are not limited to antigens or antibodies for coagulation and fibrinolysis-related inspections such as an anti-antiplasmin antibody for antiplasmin inspection, an anti-D-dimer antibody for D-dimer inspection, an anti-FDP antibody for FDP inspection, an anti-tPA antibody for tPA inspection, an anti-thrombin=antithrombin complex antibody for TAT inspection, and an anti-FPA antibody for FPA inspection; antigens or antibodies for tumor-related inspections such as an anti-BFP antibody for BFP inspection, an anti- CEA antibody for CEA inspection, an anti-AFP antibody for AFP inspection, an anti-ferritin antibody for ferritin inspection, and an anti-CA19-9 antibody for CA19-9 inspection; antigens and antibodies for serum protein-related inspections such as anti-apolipoprotein antibody for apolipoprotein inspection, an anti-beta2-microbloblin antibody for beta2-microbloblin inspection, an anti-alpha1-microglobulin antibody for alpha1-microglobulin inspection, an anti-immunoglobulin antibody for immunoglobulin inspection, an anti-CRP antibody for CRP inspection, and the like; antigens and antibodies for endocrine function inspection such as an anti-HCG antibody for HCG inspection; antigens and antibodies for infection-related inspections such as an anti-HBs antibody for HBs antigen inspection, an HBs antigen for HBs antibody inspection, an HCV antigen for HCV antibody inspection, an HIV-1 antigen for HIV-1 antibody inspection, an HIV-2 antigen for HIV-2 antibody inspection, an HTLV-1 antigen for HTLV-1 inspection, a mycoplasma antigen for mycoplasma infection inspection, a toxoplasma antigen for toxoplasma inspection, and a streptolysin O-antigen for ASO inspection; antigens and antibodies for autoimmune-related inspections such as a DNA antigen for anti-DNA antibody inspection, and a heat-denatured human IgG for RF inspection; and antigens and antibodies for drug analysis such as an anti-digoxin antibody for digoxin inspection and an anti-lidocaine antibody for lidocaine inspection. As the antibody, either polyclonal antibodies or monoclonal antibodies may be used.

2. EXAMPLES

The invention will now be described in more detail by way of examples, which should not be construed as limiting the invention.

2.1. Evaluation Method 2.1.1. Particle Size

The number average particle size of the particles and the coefficient of variation were measured using a laser diffraction particle size distribution analyzer ("SALD-200V" manufactured by Shimadzu Corp.).

2.1.2. Carboxyl Group Content

The apparent amount of surface charge was calculated using an aqueous dispersion containing 1 g of particles (solid component) by conductmetric titration described in JP-A-10-270233. The amount of background charge was calculated in the same manner using only the dispersion medium (water). The carboxyl group content of the particles was determined from the difference of the resulting amounts of charges.

2.1.3. CLEIA (Chemiluminescence Enzyme Immunity Assay)

10 microliters of particle dispersions (equivalent to 50 micrograms of particles) obtained in the later-described Examples and Comparative Examples, sensitized with an anti-AFP antibody, were taken in a test tube and mixed with 50 microliters of a standard sample of an AFP antigen (manufactured by Nippon Biotest Laboratories Inc.) diluted to a concentration of 100 ng/ml with fetal calf serum (FCS). The mixture was reacted at 37° C. for 10 minutes. After magnetically separating the particles and removing the supernatant liquid, 40 microliters of an anti-AFP antibody (a reagent attached to "Lumipulse AFP-N" manufactured by Fujirebio Inc.), labeled with an alkali phophatase (hereinafter referred to as "ALP") as a secondary antibody, was added, followed by a reaction at 37° C. for 10 minutes. Next, after magnetic separation and removal of the supernatant liquid, the resulting particles were washed three times with PBS and dispersed in 50 microliters of 0.01% Tween 20. The resulting dispersion was transferred to a new tube. After the addition of 100 microliters of an ALP substrate solution (Lumipulse substrate solution manufactured by Fujirebio Inc.), the mixture was reacted at 37° C. for 10 minutes to measure the amount of chemiluminescence. A chemiluminescence luminometer ("Lumat LB9507" manufactured by Berthold Japan, Co., Ltd.) was used for measuring the chemiluminescence.

2.2. Example 1

2 g of a 75% di(3,5,5-trimethylhexanoyl) peroxide solution (Peroyl 355-75(S)™ manufactured by NOF Corp.) and 20 g of a 1% aqueous solution of sodium dodecylsulfate were mixed and finely emulsified using an ultrasonic dispersion machine. The emulsion was added to a reactor containing 13 g of polystyrene particles with a particle size of 0.77 micrometers and 41 g of water and the mixture was stirred at 25° C. for 12 hours. In another vessel, 96 g of styrene and 4 g of divinylbenzene were emulsified in 400 g of a 0.1% aqueous solution of sodium dodecylsulfate. The resulting emulsion was added to the above reactor. After stirring at 40° C. for two hours, the mixture was heated to 80° C. and polymerized for eight hours. After cooling to room temperature, particles were separated by centrifugation, washed with water, dried, and ground. The ground particles were used as nuclear particles (preparation of nuclear particles). The number average particle size was 1.5 micrometers.

Next, ferrite-type fine magnetic material particles (average primary particle size: 0.01 micrometers) with a hydrophobized surface were prepared by adding acetone to an oily magnetic fluid ("EXP series" manufactured by Ferrotec Corp.) to obtain a precipitate of the particles and drying the precipitate.

Then, 15 g of the above nuclear particles and 15 g of the hydrophobized fine magnetic material particles were thoroughly mixed in a mixer. The mixture was processed by a hybridization system ("Type NHS-0" manufactured by Nara Machinery Co., Ltd.) at a peripheral blade (stirring blades) speed of 100 m/sec (16,200 rpm) for 5 minutes to obtain mother particles with a number average particle size of 2.0 micrometers and with a magnetic material layer of fine magnetic material particles on the surface (preparation of mother particles).

A 1 l separable flask was charged with 375 g of an aqueous solution of 0.25% by mass of sodium dodecylbenzenesulfonate and 0.25% by mass of a nonionic emulsifying agent (Emulgen 150™ manufactured by Kao Corp.), followed by the addition of 15 g of the mother particles having a magnetic material layer prepared above. The mother particles were dispersed using a homogenizer and heated to 60° C. Next, a pre-emulsion, prepared by ultrasonic dispersion of 12 g of cyclohexylmethacrylate as a monomer part, 3 g of 2-methacryloyloxyethyl phthalate, and 0.6 g of di(3,5,5-trimethylhexanoyl) peroxide (Peroyl 355™ manufactured by NOF Corp.) in 75 g of an aqueous solution of 0.25% by mass of sodium dodecylbenzenesulfonate and 0.25% by mass of a nonionic emulsifying agent (Emulgen 150™ manufactured by Kao Corp.), was added dropwise to the above 500 ml separable flask controlled at 60° C. over one and half hours. After heating to 75° C., the polymerization was continued for two hours before completing the reaction. A copolymer layer covering cores of mother particles was prepared by the above process. The particles in the separable flask were magnetically separated and repeatedly washed with distilled water. A dispersion of the magnetic organic polymer particles was obtained in this manner. The resulting particles are designated as particles (i). The solubility of 2-methacryloyloxyethyl phthalate in water at 25° C. is less than 0.2% by mass.

The particle size of the particles (i) was 2.8 micrometers and the carboxyl group content was 9 micromol/g.

Next, an aqueous solution of 1-ethyl-3-dimethylaminopropylcarbodiimide hydrochloride (manufactured by Dojindo Laboratories, Inc.) was added to an aqueous dispersion of 10 mg of particles (i) with a solid concentration of 1%. The mixture was stirred by rotation stirring at room temperature for two hours to activate carboxyl groups. Next, 100 micrograms of an antibody (an anti-AFP antibody, manufactured by Cosmo Bio Co., Ltd.) to human alpha-fetoprotein (AFP), which is a tumor marker, was added and the mixture was reacted at room temperature for 18 hours. After the reaction, the particles were magnetically separated, repeatedly washed with a washing solution (25 mmol/l Tris-HCl, 7.4 pH, containing 0.01% Tween 20), and diluted with the washing solution to a particle concentration of 0.5% to obtain protein-bonded particles (particles for immunoassay) with an anti-AFP antibody bonded as a primary probe. A chemiluminescence enzyme immunity assay (CLEIA) was carried out using the protein-bonded particles. As a result, the signal strength of the particles (i) was found to be 152809 (RIU).

2.3. Example 2

A dispersion liquid of magnetic material-containing organic polymer particles was obtained in the same manner as in Example 1, except for using 2-methacryloyloxyethyl succinate instead of 2-methacryloyloxyethyl phthalate. The resulting particles are designated as particles (ii). The solubility of 2-methacryloyloxyethyl succinate in water at 25° C. is less than 0.2% by mass.

The particle size of the particles (ii) was 2.8 micrometers and the carboxyl group content was 12 micromol/g.

A chemiluminescence enzyme immunity assay (CLEIA) was carried out using the particles (ii) in the same manner as the particles (ii) in Example 1. As a result, the signal strength of the particles (ii) was found to be 149250 (RIU).

2.4. Comparative Example 1

A dispersion liquid of magnetic material-containing organic polymer particles was obtained in the same manner as in Example 1, except for using methacrylic acid instead of 2-methacryloyloxyethyl phthalate. The resulting particles are designated as particles (i'). The solubility of methacrylic acid in water at 25° C. is 100% by mass.

The particle size of the particles (i') was 2.2 micrometers and the carboxyl group content was 16 micromol/g.

A chemiluminescence enzyme immunity assay (CLEIA) was carried out using the particles (i') in the same manner as the particles (i) in Example 1. As a result, the signal strength of the particles (i') was found to be 55591 (RIU).

It can be understood from the above results that the particles (i) and (ii) obtained in Examples 1 and 2 have higher sensitivity than the particles (i') obtained in Comparative Example 1 due to possession of the carboxyl group originating from the carboxylic acid monomer (A) having a specific structure.

2.5. Reference Example 1

A dispersion liquid of magnetic material-containing organic polymer particles was obtained in the same manner as in Example 1, except for using 14.9 g of cyclohexylmethacrylate and 0.1 g of 2-methacryloyloxyethyl phthalate. The resulting particles are designated as particles (ii').

The particle size of the particles (ii') was 2.8 micrometers and the carboxyl group content was 2 micromol/g.

A chemiluminescence enzyme immunity assay (CLEIA) was carried out using the particles (ii') in the same manner as the particles (ii) in Example 1. As a result, the signal strength of the particles (ii') was found to be 56443 (RIU).

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. Organic polymer particles, comprising:
   mother particles comprising nuclear particles and a magnetic material layer of superparamagnetic fine particles formed on the surface of the nuclear particles, and
   a copolymer layer comprising a structure shown by the following formula (1): wherein
   the copolymer layer covers the mother particles,
   the copolymer layer comprises a copolymer made from a compound (A) having the structure shown by the following formula (1) and a polymerizable unsaturated group and another copolymerizable monomer (B),

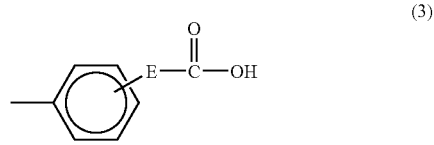

(3)

wherein A represents an alkylidene group, an alkylene group, a cyclohexylene group, or a phenylene group, and
B represents a linear or branched alkylene group or an alkylidene group having 1 to 6 carbon atoms.

2. The organic polymer particles of claim 1, wherein the structure shown by the formula (1) is derived from at least one compound selected from the group consisting of 2-(meth)acryloyloxyethyl succinate, 2-(meth)acryloyloxyethyl phthalate, 2-(meth)acryloyloxyethyl hexahydrophthalate, 2-(meth)acryloyloxypropyl succinate, 2-(meth)acryloyloxypropyl phthalate, and 2-(meth)acryloyloxypropyl hexahydrophthalate.

3. The organic polymer particles of claim 1, wherein the compound (A) is selected from the group consisting of 2-(meth)acryloyloxyethyl succinate, 2-(meth)acryloyloxyethyl phthalate, 2-(meth)acryloyloxyethyl hexahydrophthalate, 2-(meth)acryloyloxypropyl succinate, 2-(meth)acryloyloxypropyl phthalate, 2-(meth)acryloyloxypropyl hexahydrophthalate, and mixtures thereof.

4. The organic polymer particles of claim 1, wherein the copolymerizable monomer (B) is non-crosslinkable.

5. The organic polymer particles of claim 1, wherein the copolymerizable monomer (B) is crosslinkable.

6. The organic polymer particles of claim 1, wherein the copolymerizable monomer (B) is selected from the group consisting of (meth)acrylates having a hydrophilic functional group, hydrophilic monomers, aromatic vinyl monomers, vinyl esters, unsaturated nitriles, ethylenically unsaturated alkyl carboxylates and mixtures thereof.

7. The organic polymer particles of claim 1, wherein the copolymerizable monomer (B) is selected from the group consisting of 2-hydroxyethyl acrylate, 2-hydroxyethyl methacrylate, methoxyethyl acrylate, methoxyethyl methacrylate, polyethylene glycol monoacrylate, polyethylene glycol monomethacrylate, glycidyl acrylate, glycidyl methacrylate, 2,3-dihydroxypropyl acrylate, 2,3-dihydroxypropyl methacrylate, acrylamide, methacrylamide, N-methylolacrylamide, N-methylolmethacrylamide, diacetoneacrylamide, styrene, alpha-methylstyrene, halogenated styrene, vinyl acetate, vinyl propionate, acrylonitrile, methyl acrylate, methyl methacrylate, ethyl acrylate, ethyl methacrylate, butyl acrylate, butyl methacrylate, 2-ethylhexyl acrylate, 2-ethylhexyl methacrylate, lauryl acrylate, lauryl methacrylate, stearyl acrylate, stearyl methacrylate, cyclohexyl acrylate, cyclohexyl methacrylate, isobornyl acrylate, isobornyl methacrylate, and mixtures thereof.

8. The organic polymer particles of claim 1, wherein the copolymerizable monomer (B) is selected from the group consisting of polyfunctional (meth)acrylates, conjugated diolefins, and mixtures thereof.

9. The organic polymer particles of claim 1, wherein the copolymerizable monomer (B) is selected from the group consisting of polyethylene glycol diacrylate, polyethylene glycol dimethacrylate, and poly(meth)acrylates of a polyvinyl alcohol, and mixtures thereof.

10. The organic polymer particles of claim 1, wherein the copolymerizable monomer (B) is selected from the group consisting of ethylene glycol diacrylate, ethylene glycol dimethacrylate, trimethylolpropane triacrylate, trimethylolpropane trimethacrylate, pentaerythritol triacrylate, pentaerythritol trimethacrylate, dipentaerythritol hexacrylate, dipentaerythritol hexamethacrylate, butadiene, isoprene, divinylbenzene, diallyl phthalate, allyl acrylate, allyl methacrylate, and mixtures thereof.

11. The organic polymer particles of claim 1, wherein the copolymerizable monomer (B) comprises acrylic acid, methacrylic acid, maleic acid, itaconic acid and mixtures thereof.

12. The organic polymer particles of claim 1, wherein the nuclear particles are composed of a non-magnetic material.

13. The organic polymer particles of claim 1, wherein the nuclear particles are composed of a non-magnetic organic polymer.

14. The organic polymer particles of claim 1, wherein the superparamagnetic fine particles comprise ferrite.

15. The organic polymer particles of claim 1, wherein the amount of the carboxyl group per the amount of solid components of the copolymer layer is from 1 to 300 micromol/g.

16. The organic polymer particles of claim 1, wherein the thickness of the copolymer layer is 0.01 micrometers or more.

17. A method for making the organic polymer particles of claim 1, comprising covering the mother particles with the copolymer layer.

18. A method of binding a protein, comprising contacting the organic polymer particles of claim 1 with a protein.

* * * * *

UNITED STATES PATENT AND TRADEMARK OFFICE
CERTIFICATE OF CORRECTION

PATENT NO. : 7,981,512 B2
APPLICATION NO. : 11/773801
DATED : July 19, 2011
INVENTOR(S) : Kouji Tamori et al.

It is certified that error appears in the above-identified patent and that said Letters Patent is hereby corrected as shown below:

In Column 14, Lines 30-35:

" 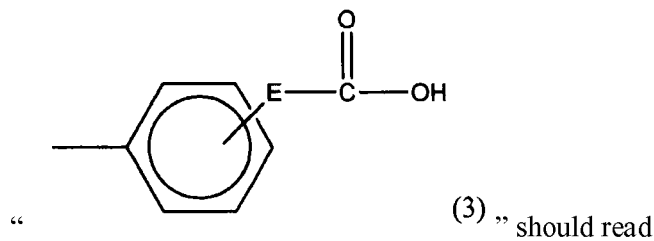 (3) " should read

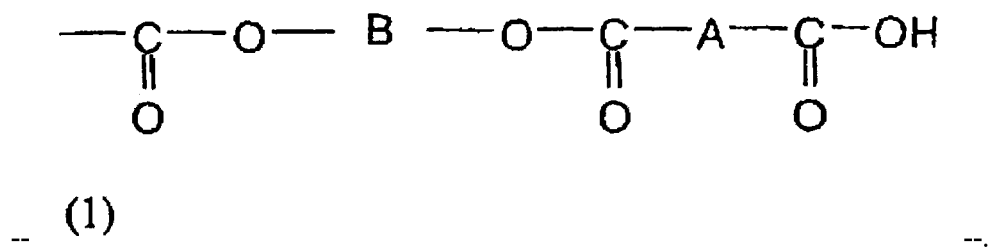

-- (1) --.

Signed and Sealed this
Fifth Day of February, 2013

Teresa Stanek Rea
*Acting Director of the United States Patent and Trademark Office*